Sept. 11, 1951  H BLATZ  2,567,363
VERTICAL FLUOROSCOPE APPARATUS
Filed Nov. 22, 1947  11 Sheets-Sheet 2
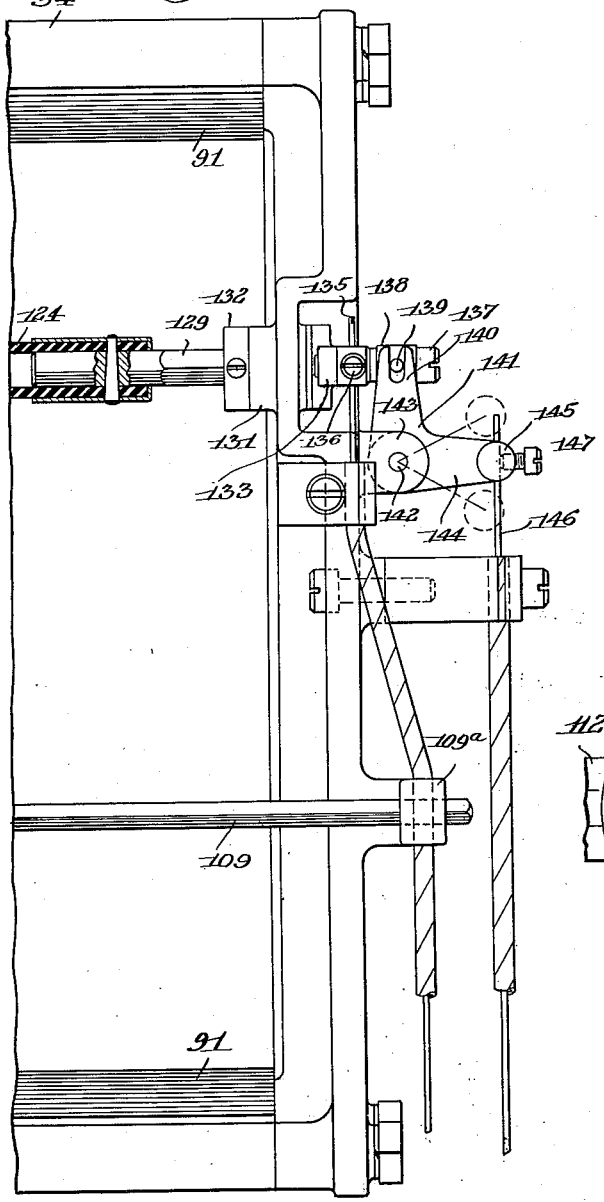
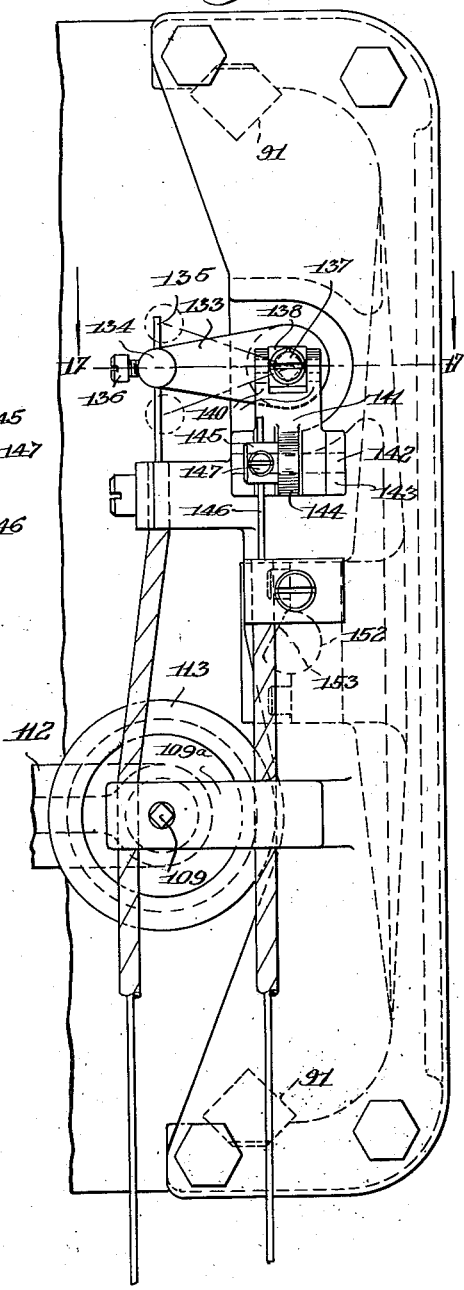
INVENTOR.
Hanson Blatz
BY
Edward H Rumpston
his Attorney Sept. 11, 1951 H BLATZ 2,567,363
VERTICAL FLUOROSCOPE APPARATUS
Filed Nov. 22, 1947 11 Sheets-Sheet 3
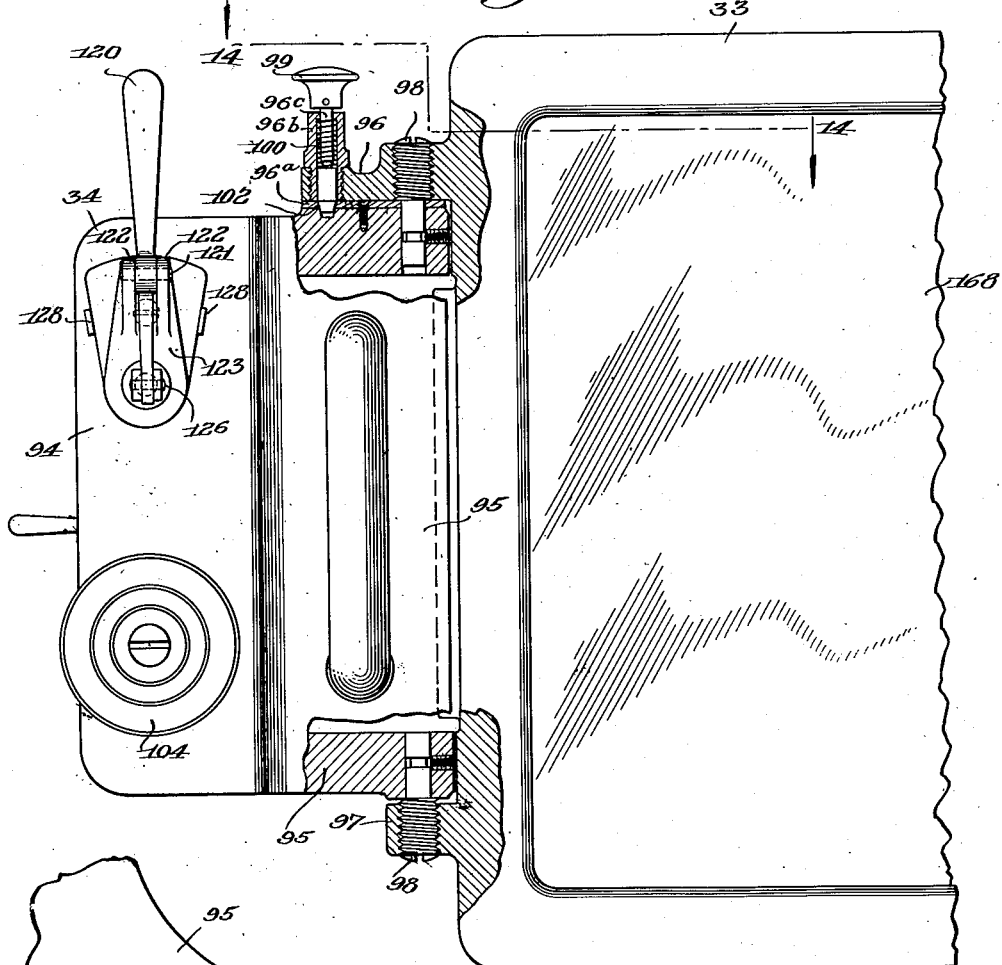
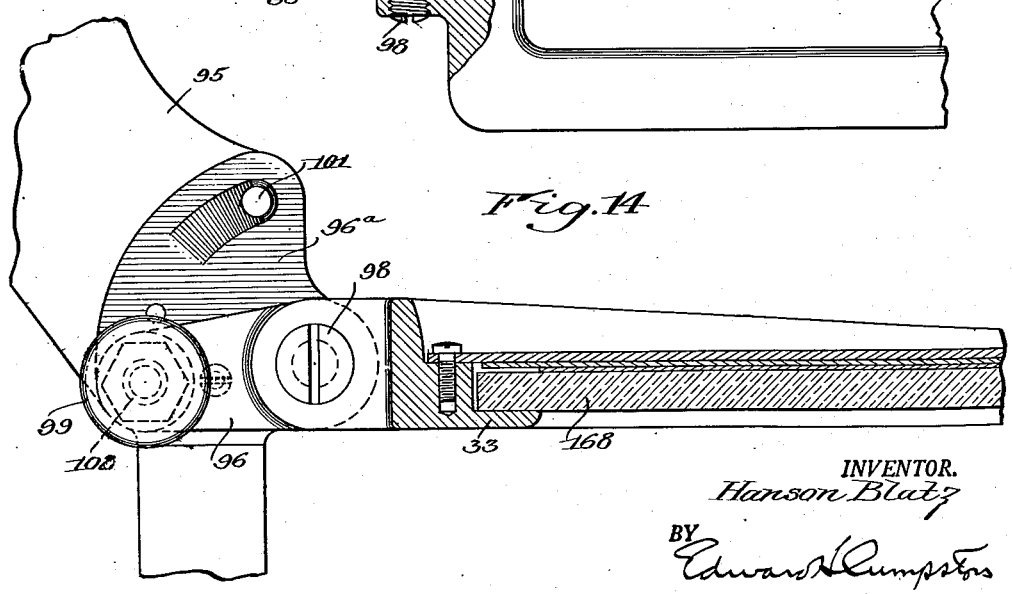
INVENTOR.
Hanson Blatz
BY
his Attorney Sept. 11, 1951  H BLATZ  2,567,363
VERTICAL FLUOROSCOPE APPARATUS
Filed Nov. 22, 1947  11 Sheets-Sheet 4
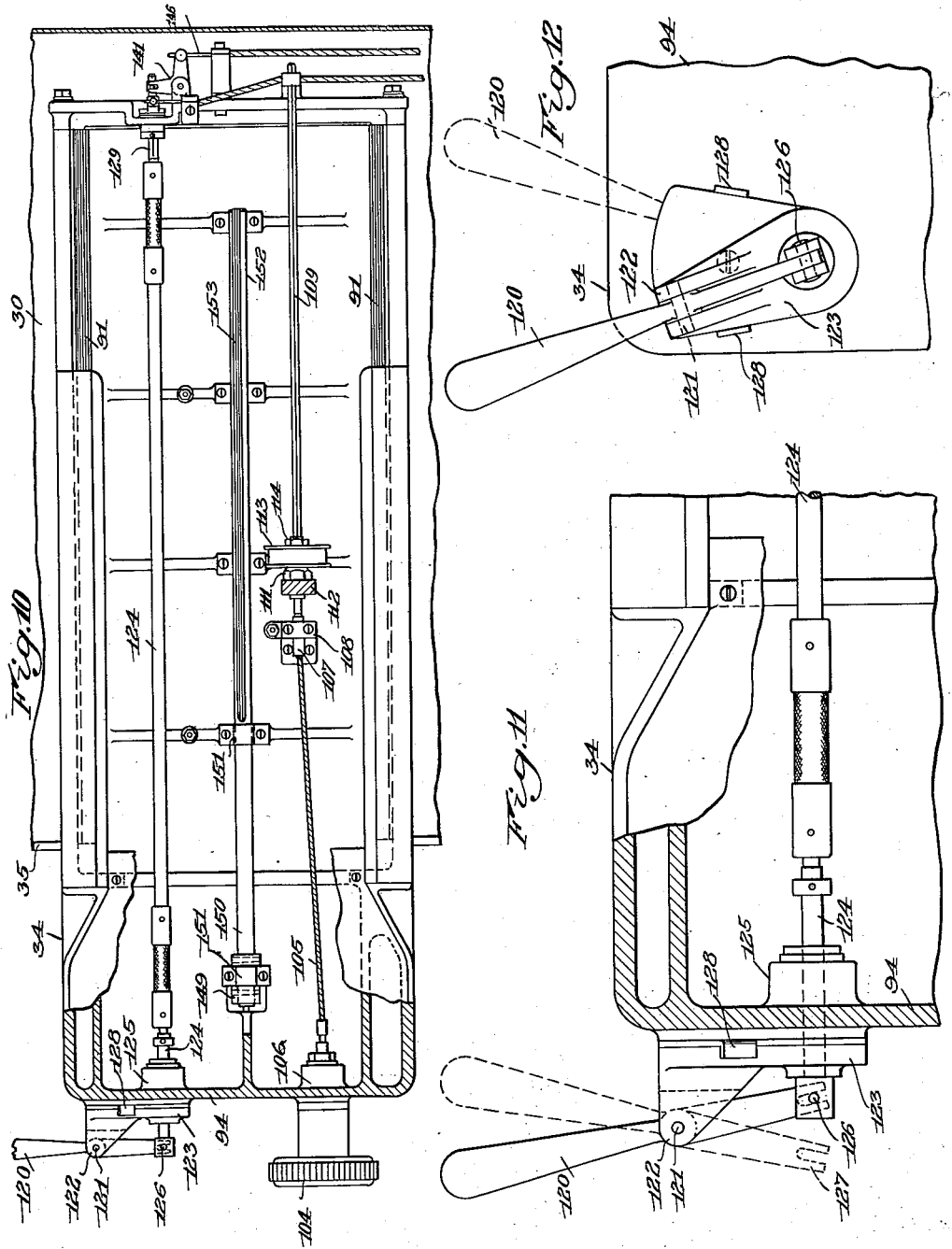
INVENTOR.
Hanson Blatz
BY
Edward H Cumpston
his Attorney

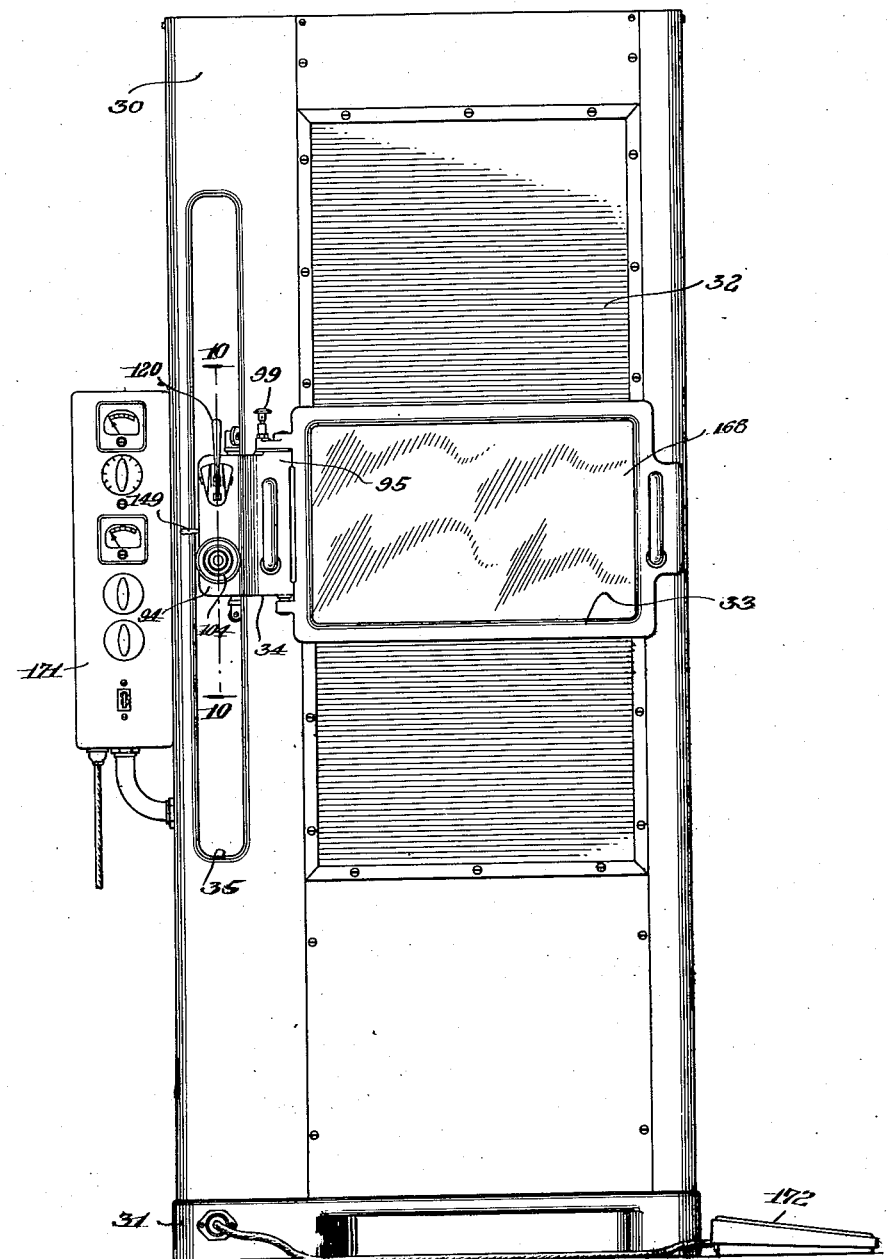

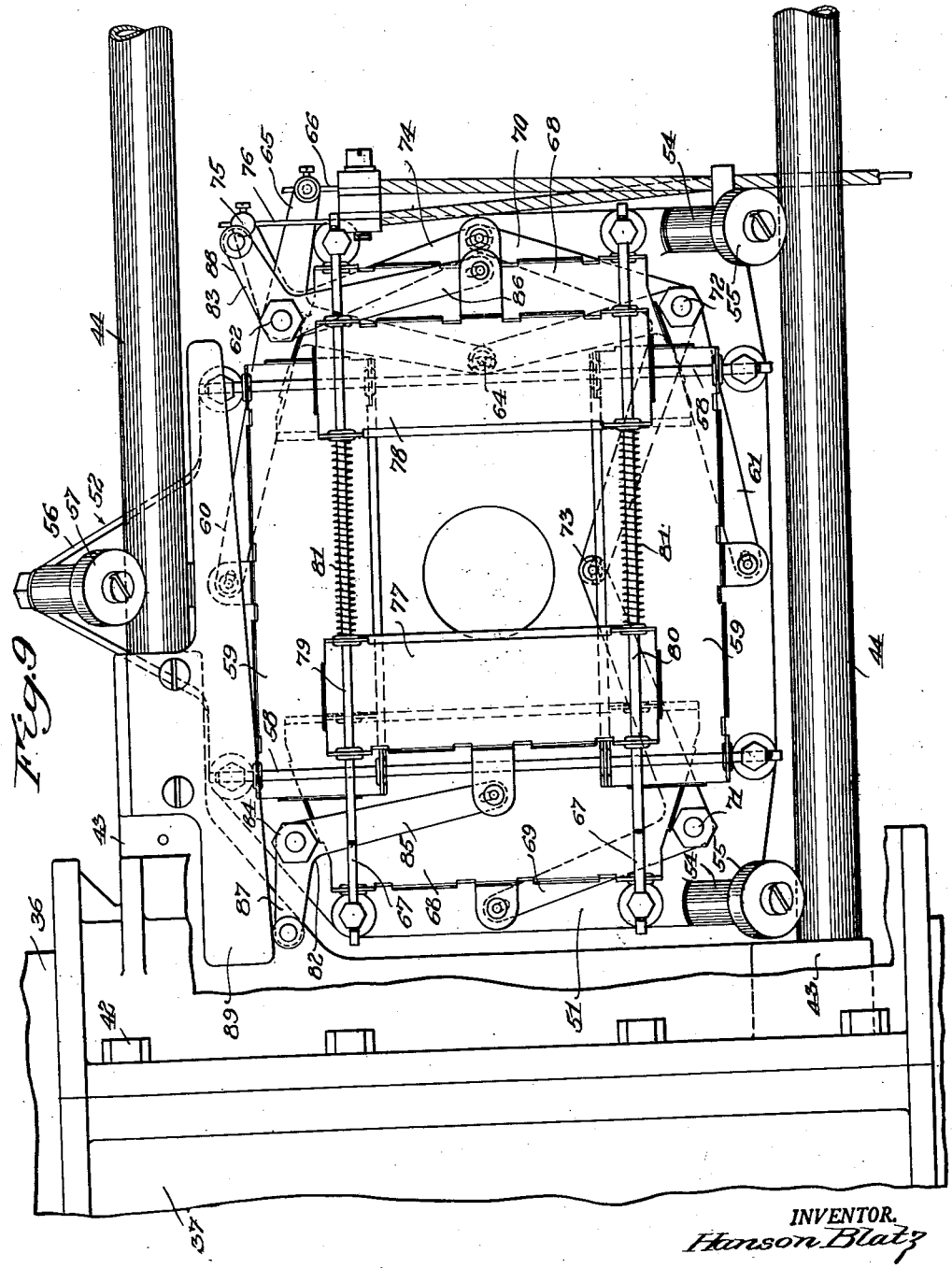

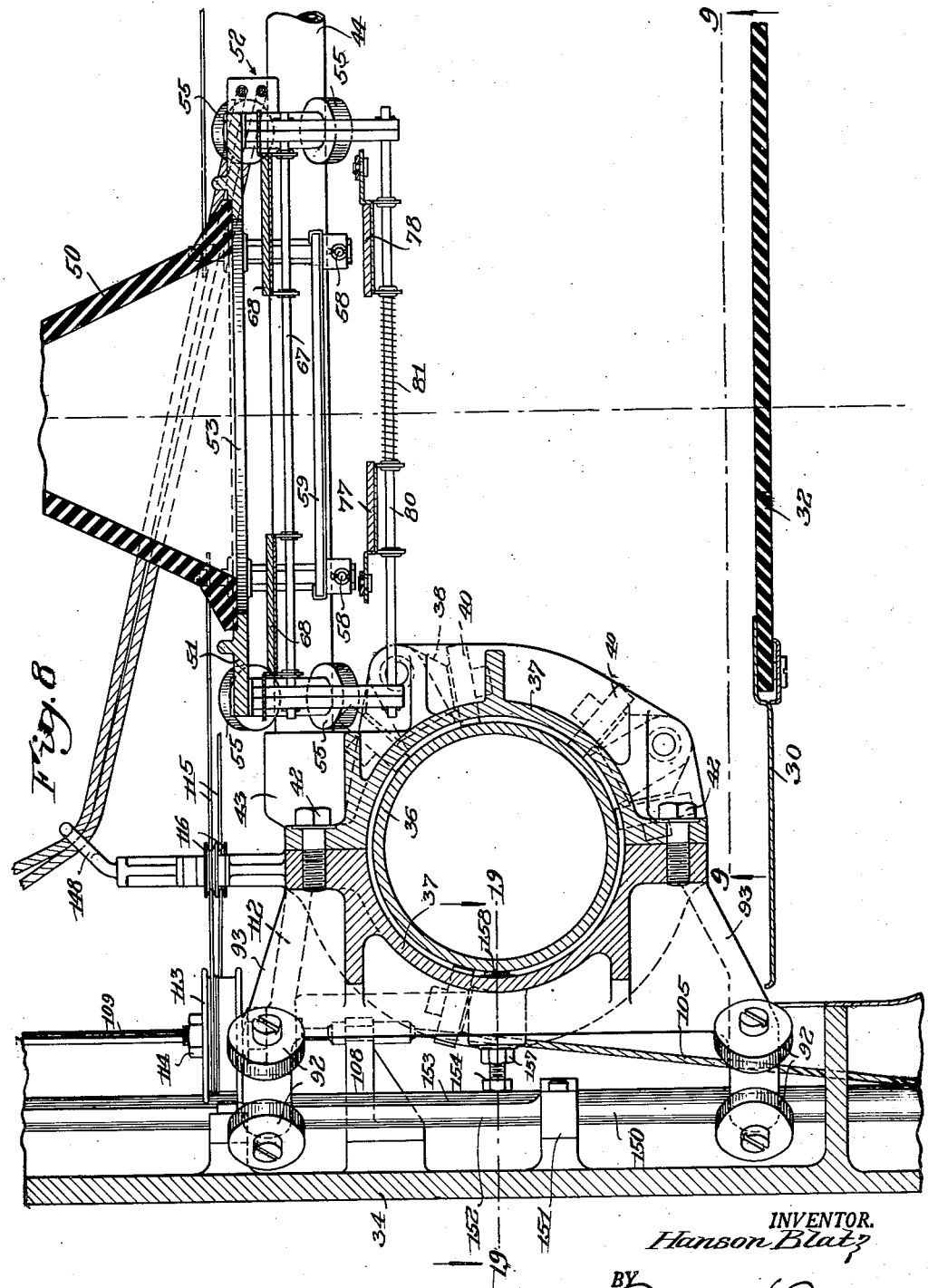

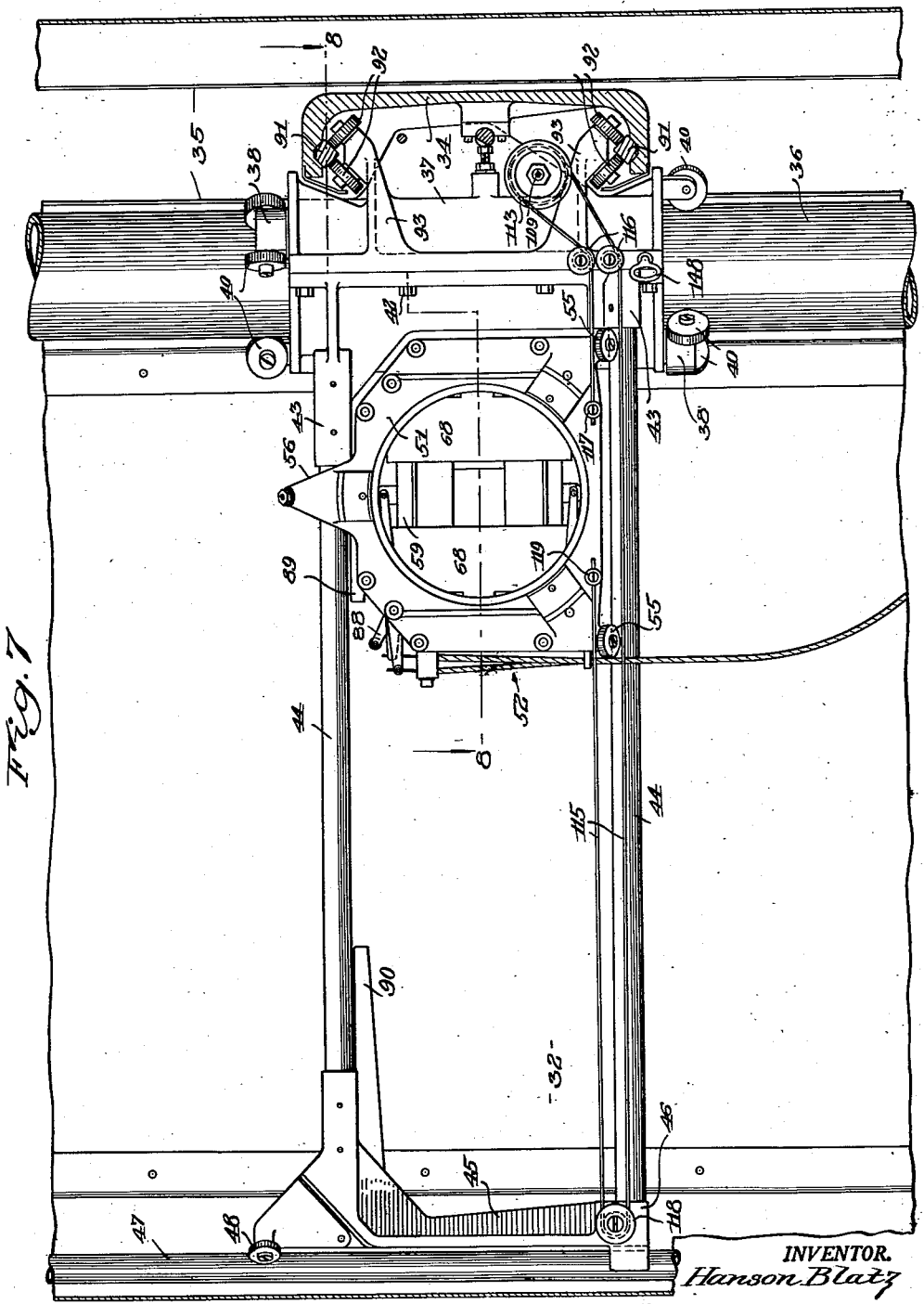

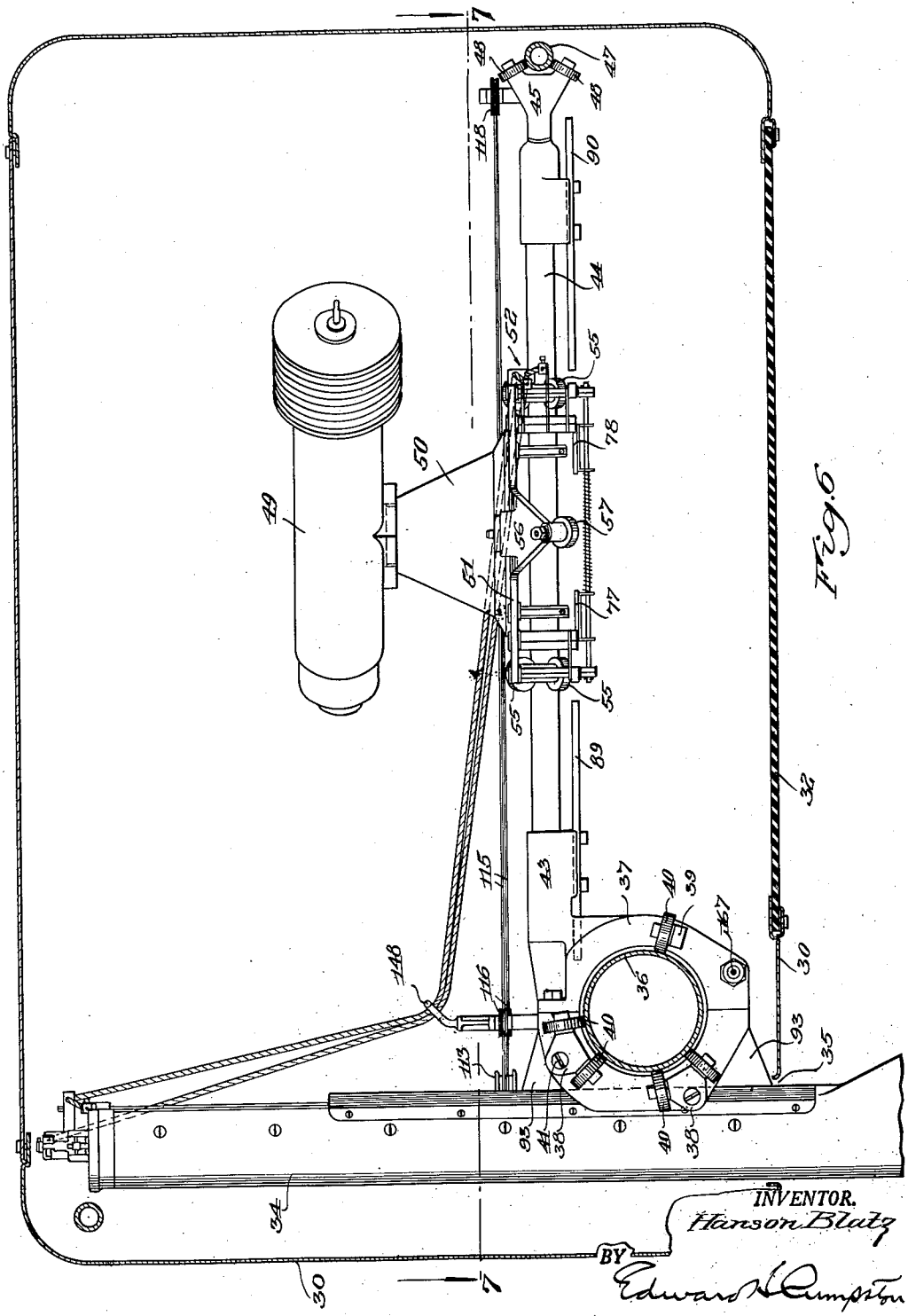

Sept. 11, 1951     H BLATZ     2,567,363
VERTICAL FLUOROSCOPE APPARATUS

Filed Nov. 22, 1947     11 Sheets-Sheet 9

INVENTOR.
Hanson Blatz
BY Edward H. Cumpston
his Attorney

Sept. 11, 1951 H BLATZ 2,567,363
VERTICAL FLUOROSCOPE APPARATUS
Filed Nov. 22, 1947 11 Sheets-Sheet 10
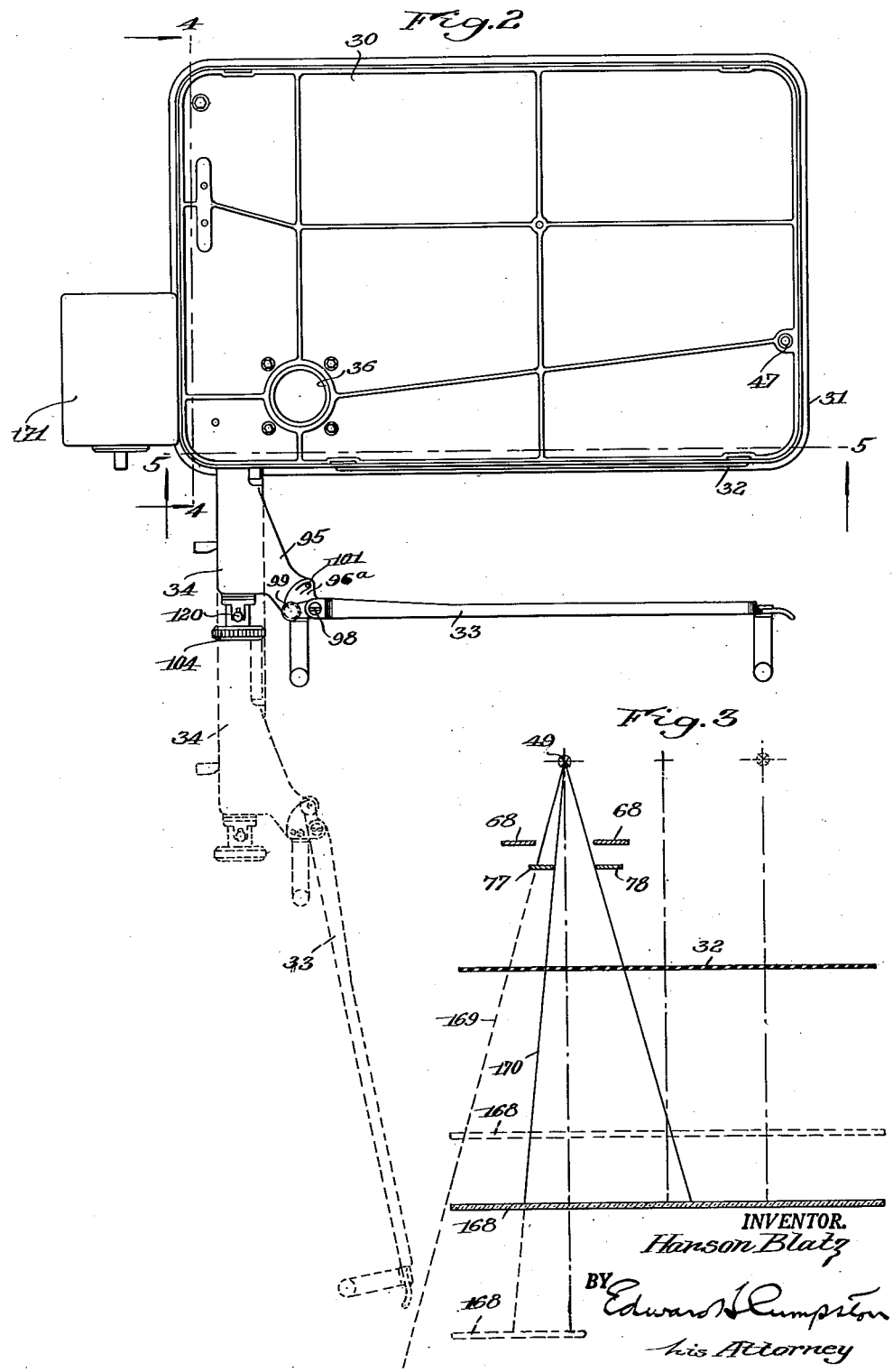
INVENTOR.
Hanson Blatz
BY Edward H Cumpston
his Attorney Sept. 11, 1951     H BLATZ     2,567,363
VERTICAL FLUOROSCOPE APPARATUS
Filed Nov. 22, 1947     11 Sheets-Sheet 11
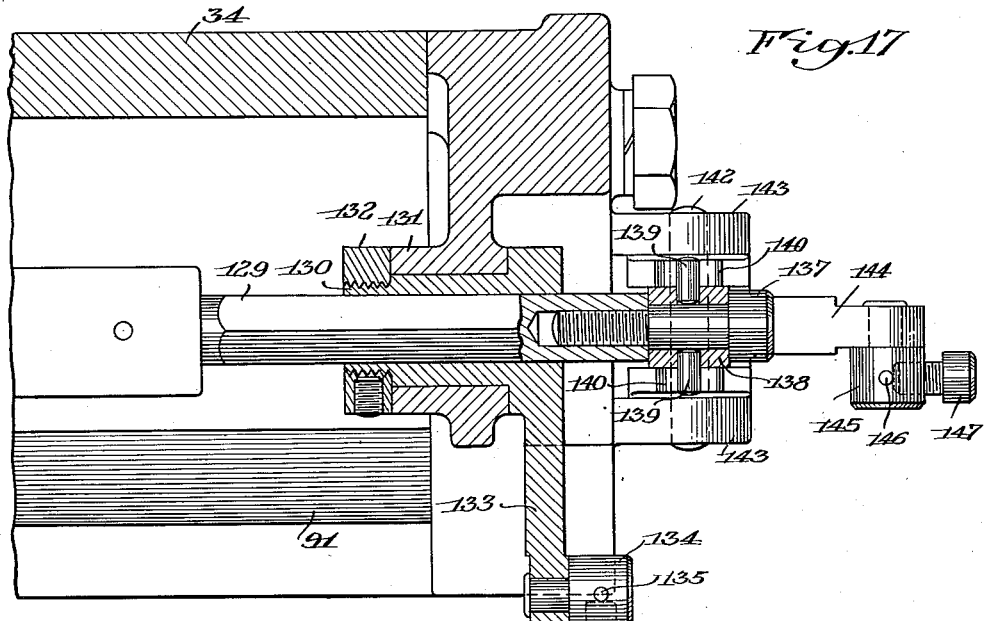
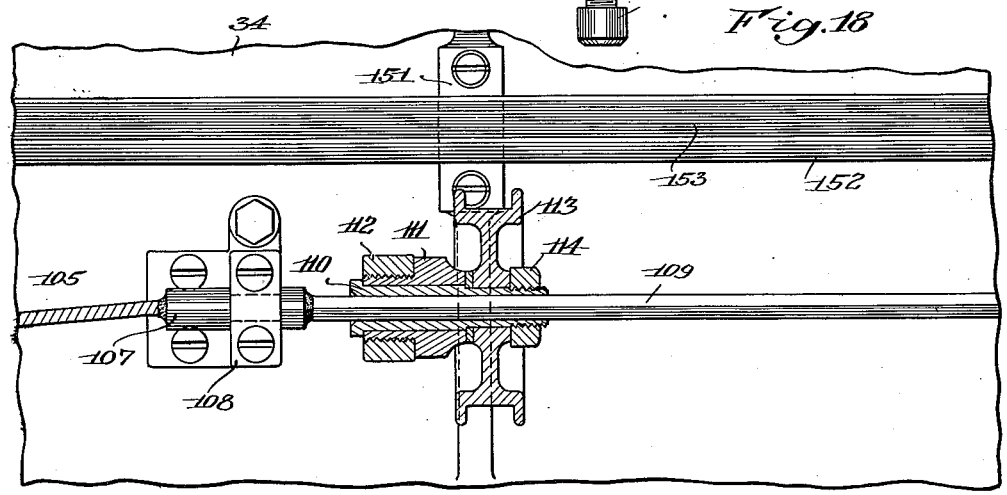
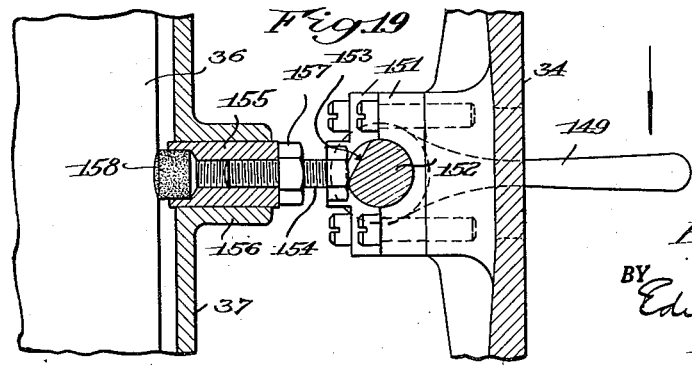
INVENTOR.
Hanson Blatz
BY Edward H. Crumpston
his Attorney Patented Sept. 11, 1951

2,567,363

UNITED STATES PATENT OFFICE 2,567,363

VERTICAL FLUOROSCOPE APPARATUS

Hanson Blatz, Rochester, N. Y., assignor to Ritter Company, Inc., Rochester, N. Y., a corporation of Delaware Application November 22, 1947, Serial No. 787,597

14 Claims. (Cl. 250—58)

This invention relates to fluoroscopy and, more particularly, to vertical fluoroscope apparatus, one object of the invention being to provide a more simple, efficient and safe type of construction.

Another object is to provide an apparatus of the character indicated, having adjustable arm means for supporting the fluoroscopic screen, of a more simple and convenient construction.

Another object is to provide control means for positioning and securing the parts of such an apparatus which are more simple and effective in operation and more conveniently arranged on the apparatus.

A further object is to provide improved auxiliary shutter means for the X-ray tube automatically confining the projected rays to the area of the screen and protecting the operator against stray radiation.

A still further object is the provision of apparatus having the above advantages in a practical type of construction adapted to be readily manufactured and assembled at relatively low cost.

To these and other ends the invention resides in certain improvements and combinations of parts, all as will be hereinafter more fully described, and novel features being pointed out in the claims at the end of the specification.

In the drawings:

Fig. 1 is a front elevation of an apparatus embodying the present invention;

Fig. 2 is a top plan view of the same, showing in full lines the operating positions of the screen and screen arm and in broken lines the different arrangement of the parts as disposed for positioning a subject to be examined or for radiographic work;

Fig. 3 is a diagrammatic plan view showing the operation of the automatic auxiliary shutter means;

Fig. 6 is an enlarged sectional plan view on the line 6—6 in Fig. 5, with parts broken away;

Fig. 7 is an enlarged sectional elevation on the line 7—7 in Fig. 6, showing more particularly the supporting means for the screen arm and the frame for supporting the tube mounting;

Fig. 8 is an enlarged sectional plan view on the line 8—8 in Fig. 7;

Fig. 9 is an enlarged elevation of the tube mounting and shutter parts and the supporting frame therefor, substantially as seen from the line 9—9 in Fig. 8, with parts broken away;

Fig. 10 is an enlarged elevation of the screen arm as viewed from the right in Fig. 1 and partly in section on the line 10—10 in said figure;

Fig. 11 is an enlargement of parts shown in Fig. 10 for manually controlling the shutter blades;

Fig. 12 is an elevation of parts shown in Fig. 11 as viewed from the left in said figure;

Fig. 13 is an enlarged elevation, partly in section, of the front end of the screen arm and of its connection with the screen;

Fig. 14 is a sectional plan view on the line 14—14 in Fig. 13;

Fig. 15 is an enlarged elevation of parts shown at the right hand end of Fig. 10, for manually controlling the shutter blades;

Fig. 16 is an elevation of the parts shown in Fig. 15, as viewed from the right in said figure;

Fig. 17 is an enlarged sectional plan view on the line 17—17 in Fig. 16, showing parts of the manual shutter blade control;

Fig. 18 is an enlarged sectional elevation of parts shown in Fig. 10, for manually moving the tube mounting transversely of the screen, and Fig. 19 is an enlarged elevation on the line 19—19 in Fig. 8.

Figure 4:
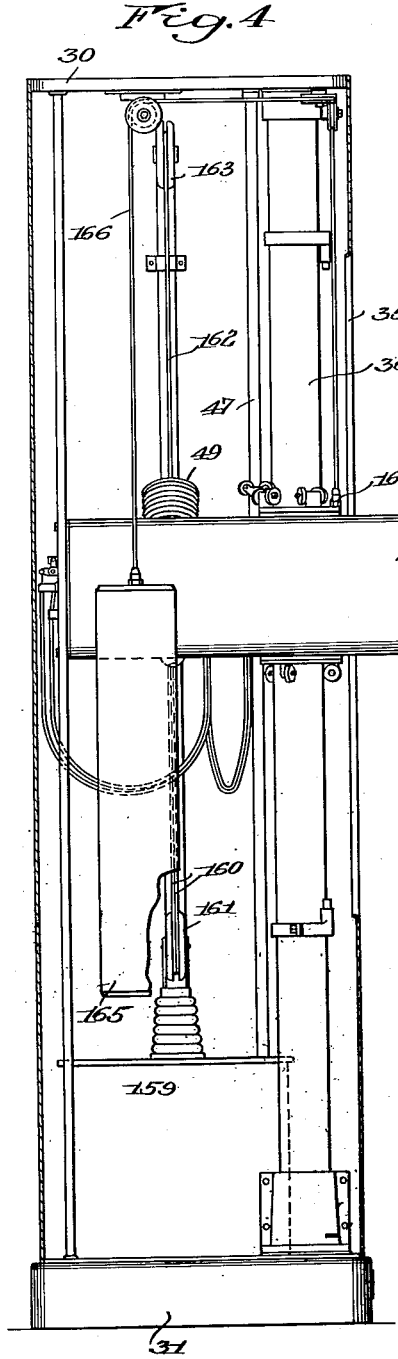
Fig. 4 is a sectional elevation on the line 4—4 in Fig. 2, with parts broken away.

The preferred embodiment of the invention, herein disclosed by way of illustration, comprises a shock-proof, metallic casing 30, of generally rectangular shape, on a base 31, the front wall of the casing including a panel 32, of suitable ray-transmitting material, against which the subject to be examined is positioned. The casing is preferably grounded, by any known or suitable means (not shown), so as to render it shock-proof, as well understood in the art. A fluorescent screen 33 is mounted in front of the panel on the forward end of an arm 34 slidable longitudinally in and out of the casing through a vertically elongated slot 35 at one side of the front wall of the casing. By such sliding movement of arm 34, the screen is adjusted toward or from the panel, and the arm is mounted for such movement on vertically adjustable supporting means for the arm and the X-ray tube, located within the casing, as will now be described.

Within the casing is a vertical cylindrical column 36 secured at its top and bottom, by any suitable means, to the top of the casing and the base. Loosely surrounding the column is a sleeve 37, provided at its upper and lower ends with brackets 38 and 39 carrying rollers, as 40, bearing on the column to support and guide the sleeve for vertical adjustment on the column with a minimum of friction. Brackets 38 preferably have a pivotal connection with the sleeve, being each attached thereto by means of a single screw 41, so that the rollers of each bracket are capable of compensating adjustment to small inequalities in the surface of the column, thereby avoiding the necessity for finishing the surface of the column.

Supporting sleeve 37 is preferably made in two castings bolted together at 42, as shown, one of such castings being formed, adjacent top and bottom, with recessed extensions 43 providing sockets for the inner ends of a pair of vertically spaced guide rods 44 having their outer ends extending adjacent the opposite side wall of the casing, as shown, and connected by a casting 45. Casting 45 has its lower end 46 bifurcated for sliding engagement with an auxiliary column 47 fixed at top and bottom to the top and base of the casing, the upper end of the casting being likewise bifurcated and equipped with rollers 48 for engagement with column 47 to steady and guide the outer end of the tube frame.

The X-ray tube 49, of any known and suitable type, has its cone 50 fixed to the rear plate 51 of a tube carriage, indicated generally at 52, the cone being attached to the plate around the periphery of an opening 53 in the plate through which the rays are projected. Plate 51 carries, at each end of its lower edge, a pair of trunnions, as 54, on each of which is journalled a roller 55 in engagement from opposite sides with the lower of the guide rods 44. The upper edge of the plate has an upward extension 56 overhanging the upper guide rod 44 and having journalled thereon a roller 57 in engagement with the guide rod, the tube mounting being thus supported for substantially frictionless adjustment longitudinally of its supporting frame and horizontally across the exposure panel of the casing.

The shutter means for the tube are mounted on the forward side of mounting plate 51, comprising a pair of vertical guide rods 58 (Fig. 9), on which a pair of blades 59 are mounted for vertical sliding movement from opposite sides toward and from the projected rays to control the vertical extent thereof. The means for adjusting blades 59 comprises upper and lower bell crank levers 60 and 61, pivoted on the mounting plate at 62 and 72, respectively, each lever having one arm pivotally connected with a lug on the outer edge of the corresponding blade. The other arms of the levers are pivotally connected with each other at 64 and the upper lever 60 has an extension 65 to which is attached a push-pull wire 66, by means of which the blades 59 may be moved simultaneously, by means hereafter described, to reduce or enlarge the height of the projected rays.

Mounting plate 51 carries also a pair of vertically spaced horizontal rods 67 (Figs. 8 and 9), on which a pair of blades 68 are slidable horizontally from opposite sides toward and from the projected rays to control the horizontal extent thereof. The means for adjusting blades 68 comprises a pair of bell crank levers 69 and 70, pivoted at 71 and 72, respectively, on the mounting plate and each having one arm pivotally connected with the outer edge of the corresponding blade 68. The other arms of these levers are pivotally connected with each other at 73, and lever 70 has its first mentioned arm pivotally connected also with one arm of a bell crank lever 74 pivoted at 62 on the plate and having attached to its other arm 75 a push-pull wire 76, by means of which the blades 68 are simultaneously adjusted toward and from the beam of rays. Wires 66 and 76 are actuated by manually operable means hereafter described.

The tube shutter is also equipped with a third pair of blades, 77 and 78, sliding horizontally toward and from each other on vertically spaced guide rods, 79 and 80, on the mounting plate. Coiled compression springs, as 81, are inserted between the blades on the guide rods for normally moving them apart and means are provided for moving them together to further restrict the projected rays comprising, preferably, a pair of bell crank levers, 82 and 83, pivotally supported on the mounting plate at 84 and 62, respectively. Each lever has one arm, as 85 and 86, pivotally connected with a lug on the outer edge of the corresponding one of the blades, 77 and 78, as shown, and the other arm of each lever, as 87 and 88, is provided with a roller for engagement with corresponding cam plates 89 and 90, fixed on the respective ends of the tube frame. The lower edges of cam plates 89 and 90 are inclined downwardly and outwardly of the tube frame in position to engage the levers 82 and 83, as the tube mounting approaches the end of its travel toward one side or the other of its frame, to automatically move the blade 77 or 78 to intercept the outer rays and restrict the beam within the outlines of the screen. All of the above shutter blades include the usual lead plates for effectively obstructing the tube rays.

The above described sleeve 37 and its frame for supporting the tube mounting are adjusted vertically by vertical adjustment of the arm 34 which is slidably supported on sleeve 37. To this end, arm 34 is generally channel-shaped in cross section (Figs. 7 and 10), with its open side disposed toward the interior of the casing, as shown. Each of the top and bottom legs of the arm have fixed thereto a longitudinally extending guide rail 91 having downwardly and inwardly inclined faces engaged by pairs of rollers 92 journalled on brackets 93 carried by sleeve 37 and projecting within the arm, as shown. By this means, the arm is supported and guided for substantially frictionless longitudinal sliding movement on sleeve 37, forwardly and rearwardly, through slot 35 in the front wall of the casing.

The forward end of arm 34 is preferably closed by a wall 94 (Figs. 10 and 11), which is formed with a projection 95 extending horizontally toward the exposure panel to support the screen. For this purpose, the frame of screen 33 (Figs. 13 and 14) is made with vertically spaced lugs, 96 and 97, carrying threadedly adjustable pins 98, rotatably inserted in bearing openings in the top and bottom of arm portion 95, a wear plate 96a being fixed on the top of the arm portion to provide a bearing surface for the pivotal movement of the screen frame thus provided. Lug 96 of the frame carries a sleeve 96b in which slides a vertical plunger 96c having an operating handle 99. A compression spring 100 coiled in the sleeve about the plunger, bears against a shoulder on the latter to normally move it downwardly until stopped by engagement of handle 99 with the top of the sleeve. The lower end of the plunger is arranged to engage with one or the other of a pair of spaced openings 101 and 102 formed in the plate 96a at the top of arm portion 95, so that the screen may be releasably secured in either the full line position of use shown in Fig. 2, in which it lies parallel with the exposure panel, or in the position shown in dotted lines in which it is advanced and swung outwardly away from the panel for convenience in positioning the subject, or for purposes of radiography. Arm portion 95 and the outer end of the screen frame are each provided with a handle, as shown, for conveniently effecting the described adjustments.

The manually operable means for adjusting the tube mounting horizontally is located mainly on the arm 34, comprising, preferably, a rotatable hand knob 104 on the forward end of a flexible shaft 105 extending longitudinally of the arm (Fig. 10), the forward end of the shaft being rotatably supported in a bearing in a boss 106 in the front wall 94 of the arm. The rear end of shaft 105 is fixed to the forward end of a rigid shaft 107 (Fig. 18), which is rotatably supported in a bearing 108 on the arm. Shaft 107 is formed, in rear of the bearing, with a non-circular or square main portion 109 sliding longitudinally in a bearing of corresponding shape in a sleeve 110. The sleeve has a cylindrical outer surface rotatably mounted in a bearing 111 threadedly or otherwise fixed in the outer end of a bracket 112 (Figs. 8, 10 and 18) on the supporting sleeve 37. The rear end of shaft 109 is rotatably supported in a bracket 109a on the rear end of arm 34. Sleeve 110 has fixed thereto a pulley 113, retained thereon by a nut 114. A cord or other flexible element 115 is wound several times around the pulley to obtain the desired friction and its ends are carried around guide pulleys 116 on sleeve 37. One end is then connected at 117 with a post on the tube mount, the other end being carried across the casing, and around an idler pulley 118 and back to the tube mount to which it is fastened at 119. It is evident from this construction that knob 104 on the front end of the screen arm may be rotated to rotate pulley 113 and, by means of the cord or belt 115, move the tube mount on its guideways in either direction transversely of the exposure panel and screen. This control is not interfered with by longitudinal adjustment of the screen arm since the shaft portion 109 slides with the arm through the pulley 113, without moving the pulley or disturbing the driving connection of the shaft therewith.

The means for adjusting the manually movable shutter blades is also carried mainly by the screen arm, comprising, preferably, a handle 120 at its forward end having its intermediate portion pivoted at 121 (Figs. 10 and 13) between spaced lugs 122 on an arm 123 fixed on the forward end of a flexible spindle 124 rotatably carried in a bearing in a boss 125 on the front wall of the arm. The shaft is extended forwardly beyond its bearing and provided with a transverse pin 126 engaged by the forked lower end 127 of handle 120. Spaced stop lugs 128 are provided on the forward end of the screen arm 34 for limiting the rocking movement of the handle 120 and spindle 124.

Spindle 124 has a squared rear end 129 (Fig. 17), sliding longitudinally in a correspondingly shaped bearing in a sleeve 130 rotating in a bearing 131 on the rear end of the arm 34. The sleeve is retained in its bearing by a nut 132 on one end of the sleeve and by the hub portion of an arm 133 fixed on the other end of the sleeve. In the free end of the arm a stud 134 is mounted for rocking movement and formed with a hole 135 for the reception of the other end of one of the push-pull wires 66 and 76, for operating the shutter blades, a screw 136 being provided to clamp the wire in the stud 134. It is evident from this construction that rocking movement of control handle 120 and its shaft 124 produces a rocking movement of arm 133 to push or pull the wire connected to one set of the shutter blades to adjust the latter.

The rear end of portion 129 of shaft 124 carries a rocking stud 137, the shank of which supports a sleeve 138 carrying oppositely extending pins 139 engaged in slots in the forked ends of spaced arms 140 of a bell crank lever 141 pivotally mounted at 142 between spaced brackets 143 on the end of arm 34. The other arm 144 of the lever carries a rocking stud 145 having therein a hole 146 and a clamping screw 147 for the other end of the other one of the wires 66 and 76, for adjusting the other set of shutter blades. The push-pull wires and the tubes in which they are carried are led to the shutter with ample slackness to accommodate the movements of the tube mounting and of the screen arm, their slack portions being carried through the eye of a ring bolt 148 on sleeve 37, to retain such portions in proper position to prevent interference with other parts of the mechanism. The friction of the wires in their tubes is sufficient to retain the wires in desired position between successive adjustments thereof by handle 120. The two sets of blades may thus be adjusted separately by rocking the single handle in one direction or the other, or adjusted simultaneously by rocking the handle simultaneously in both directions.

Means are provided, also controlled by a single handle at the forward end of the screen arm, for simultaneously clamping the screen, screen arm and tube mounting in their adjusted positions comprising, preferably, a handle lever 149 (Figs. 2 and 10), extending through a slot in the side wall of the arm and pinned to the forward end of a rod 150. The rod is supported for rocking movement in bearings 151 on arm 34, and its rear portion 152 has one side flattened, as at 153, to provide a cross section of cam shape for actuating engagement with the outer end of a stud 154 threadedly mounted in a sleeve 155 sliding longitudinally in a bearing in a boss 156 on the supporting sleeve 37 of column 36. The stud is threadedly adjustable toward or from the cam surface 153 of the rod and is located in adjusted position by means of a nut 157. The inner end of the bearing in sleeve 155 is enlarged and carries a cylindrical plug 158, of known or suitable frictional material, such as compressed fiber composition or the like, for engagement with the surface of column 36. It is evident from this construction that the rocking of handle lever 149 serves to rock cam portion 152 on its shaft into engagement with the outer end of stud 154, forcing sleeve 155 inwardly to frictionally clamp the sleeve 37 to the column, while the frictional engagement of shaft 152 with the stud serves to clamp the screen arm 34 against longitudinal movement. By such means the parts may be locked in any position of adjustment and, on release, the tube mounting and screen may be freely adjusted vertically and the screen arm longitudinally, as conditions may require.

It is evident from the above description that the screen arm is advantageously constructed with a deep vertical channel-shaped section which affords strength and rigidity, as well as a substantial spacing between its guide rails for stable support and accurate positioning of the screen and other associated parts. This construction, furthermore, while of a hollow and light nature, is accessibly open at one side and conveniently supports and partially houses the several devices for adjustably positioning the tube and shutter blades, as well as the means for locking the arm itself in adjusted position.

Figure 5:
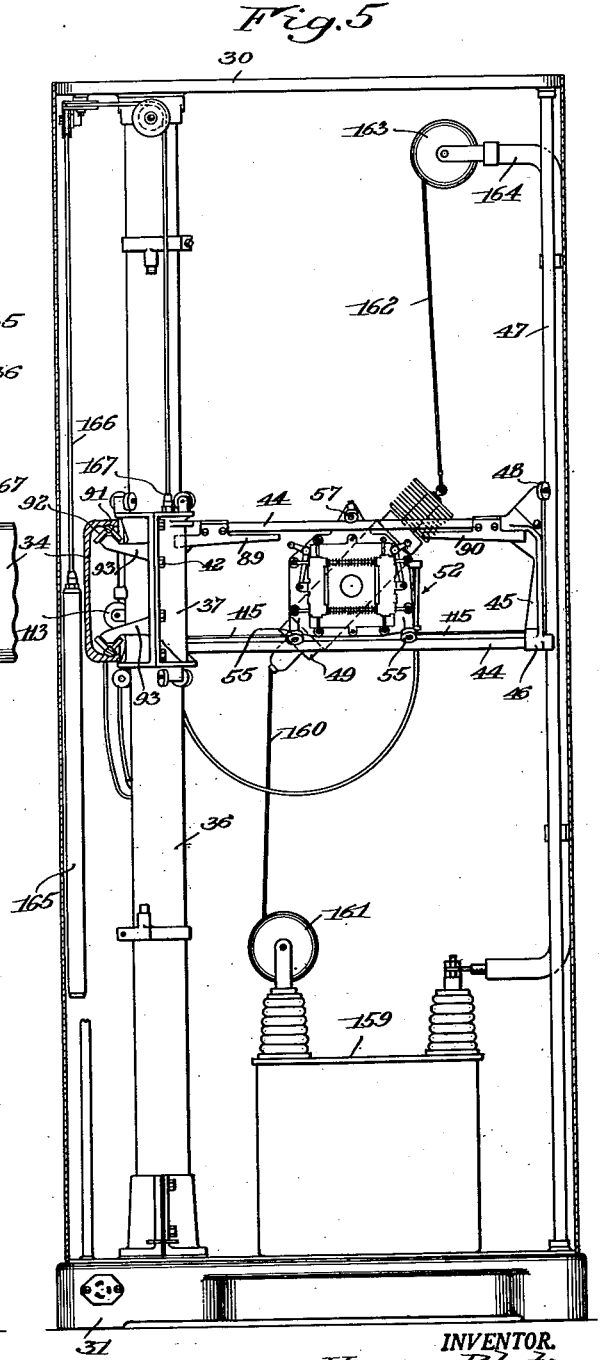
Fig. 5 is a sectional elevation on the line 5—5 in Fig. 2, with parts broken away.

The tube is energized by connections from its terminals to the usual transformer 159 on the base of the casing. Thus conductors 160 lead from one terminal of the tube to a spring-actuated rewinding drum 161 on the transformer, the drum being connected with the transformer terminals. The other end of the tube is similarly connected by a flexible conductor 162 to a spring-actuated rewind drum 163 on a tubular support 164 on the side wall of the casing through which support the drum is connected with the other terminal of the transformer. Such rewind drums automatically take up the slack in the conductors in all positions of adjustment of the tube and thus keep them clear of other parts of the mechanism. The vertically movable parts are preferably counterbalanced by means of a weight 165 (Figs. 4 and 5), suspended by a cable 166 passing around pulleys mounted in the top of the casing and thence downwardly into attachment at 167 with the top of sleeve 37.

The screen 33 includes the usual thick lead glass plate 168 (Fig. 14), for protecting the operator, the projected rays being confined well within the outlines of this shielding plate. The operation of this safety feature is further illustrated by the diagram of Fig. 3, where the tube 49 is shown in its extreme left hand position and the screen 168 is shown in different positions of adjustment relative to the exposure panel 32. It is evident from this diagram that with the manually operable blades 68 substantially opened, such adjustments of the parts might be made as to permit the outermost rays 169 at the left to be projected beyond the corresponding edge of the screen, so that they might become incident on the hands or other portions of the body of the operator. By means of the described automatic blade mechanism, however, the approach of the tube to such extreme position brings about a corresponding inward adjustment of auxiliary blade 77 to intercept the outermost rays as 169 and confine the beam as at 170 well within the limits of the safety shield of the screen.

The circuit control means and indicating instruments are conveniently arranged on the panel of a housing 171 mounted on the side of the casing adjacent the described handle means for controlling the positions of the tube and screen and operating the shutter and the circuit is opened and closed by a flexibly connected foot switch 172 conveniently positioned on the floor at the base of the apparatus.

The invention thus provides a simple, compact and convenient apparatus in which the screen is supported entirely by means projecting through the front wall of the casing, leaving its side walls clear and unencumbered. In use, the vertical screen has a simple mode of adjustment toward and from the subject by longitudinal movement of the screen arm and the screen and tube are adjustable vertically by vertical movement of the same arm. The means for positioning the tube horizontally relatively to the screen is a single handle located within convenient reach on the front end of the same screen arm. A single handle in the same location serves to adjust both the horizontal and vertical blades of the shutter, while the tube and screen are released and locked in adjusted positions by the adjacently positioned handle 149. Such arrangements facilitate the use of a screen of conveniently maximum width in combination with a tube mount conveniently adjustable transversely of the screen, safeguarded by an automatic shutter control which insures the confinement of the projected rays within the safety shield of the screen.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A vertical fluoroscopic apparatus comprising a stationary casing having a substantially vertical front wall formed along one side thereof with a substantially vertical slot, supporting means mounted for substantially vertical movement in said casing in rear of said wall, an X-ray tube on said supporting means, an arm mounted for longitudinal sliding movement on said supporting means for longitudinal movement through said slot substantially normally to said wall, and a vertically disposed fluoroscopic screen mounted on the forward end of said arm for movement toward and from said wall in substantially parallel relation therewith.

2. A structure as specified in claim 1 in which said arm is channel-shaped in cross section with its open side disposed inwardly of the casing toward said supporting means, said arm being provided interiorly with guide means and said supporting means being provided with guide means extending through the open side of said arm for cooperation with the guide means therein to support and guide said arm during longitudinal movement thereof.

3. A structure as specified in claim 2 in which said tube is mounted for movement on said supporting means for variably positioning said tube horizontally relative to said screen, said arm has a closed forward end provided with a portion projecting in a direction extending transversely of said front wall, said arm portion and screen having cooperating parts supporting said screen for pivotal movement about a vertical axis and said arm having manually operable means on the forward end thereof and extending therethrough and provided in said casing with flexible connections for moving said tube horizontally on said supporting means independently of movement of said screen.

4. A structure as specified in claim 2 in which said arm is provided interiorly with vertically spaced guide rails extending longitudinally thereof and said supporting means comprise brackets projecting through the open side of said arm and provided with roller means for engagement with said guide rails to support and guide said arm for said longitudinal movements thereof.

5. A structure as specified in claim 3 in which said supporting means comprises a frame extending transversely of said wall and provided with guideways and said tube is provided with a shutter and mounted on said frame guideways for movement longitudinally thereof, said manually operable means on said arm having flexible connections with said tube and shutter for moving said tube and operating said shutter.

6. A structure as specified in claim 5 in which the manually operable means on said arm comprises a shaft of non-circular cross-sectional shape rotatably mounted in said arm and extending longitudinally thereof and said supporting means comprises a pulley rotatably mounted thereon and having a central opening therein of non-circular shape, said shaft being longitudinally slidable in said pulley opening but in driving engagement therewith, and a flexible element mounted around said pulley and connected with said tube, for moving said tube by said manually operable means in any adjusted position of said arm.

7. A structure as specified in claim 3 in which said tube has a shutter comprising a pair of sets of blades movable vertically and horizontally, respectively, and said manually operable means on said arm comprises a single handle having a pair of flexible push-pull wires connecting the same with said sets of blades, respectively, said handle being operable in one direction to adjust one of said sets of blades and movable in a different direction to adjust the other of said sets of blades in any longitudinally adjusted position of said arm.

8. A structure as specified in claim 7 in which said manually operable means comprises a spindle mounted in said arm for rocking movement and for longitudinal sliding movement, an arm fixed on said spindle, a handle pivoted on said arm and connected with said spindle, for rotary movement with said arm to rotate said shaft and for pivotal movement on said arm to move said shaft longitudinally, a second arm fixed on said shaft, a flexible push-pull wire connecting said second arm with one of said sets of shutter blades, a lever pivoted on said arm and connected with said spindle for movement by the longitudinal movement of said spindle, and a flexible push-pull wire connecting said lever with the other of said sets of shutter blades.

9. A structure as specified in claim 1 comprising a rod extending longitudinally of said arm and mounted therein for rocking movement, said rod having a cam-shaped cross section, an adjustable abutment on said supporting means and a handle adjacent the forward end of said arm for rocking said rod to frictionally engage said abutment and lock said arm in the different adjusted positions thereof.

10. A structure as specified in claim 9 comprising a vertical supporting and guiding column in said casing on which said supporting means is mounted for vertical movement, said abutment being movable on said supporting means and having a shoe for engagement with said column for simultaneously locking said arm to said supporting means and said supporting means to said column when said handle is operated to rock said rod to engage and move said abutment.

11. A structure as specified in claim 10 in which said abutment comprises a sleeve slidable longitudinally on said supporting means and having in one end thereof a set screw for engagement by said rod, the other end of said sleeve carrying a shoe for engagement with said column for the purpose specified.

12. A vertical fluoroscope apparatus comprising a stationary casing, a vertically extending screen, supporting means in said casing including a frame extending horizontally across said casing and provided with guideways, a tube mounting movable on said guideways, means for moving said mounting, auxiliary shutter blade means movable horizontally on said mounting to obstruct the outer rays from said tube, and an abutment on said frame positioned to engage and move said blade means as said mounting approaches an end of said guideways, for restricting the tube rays to said screen.

13. A vertical fluoroscope apparatus comprising a stationary casing having an exposure panel, supporting means in said casing, an arm movable longitudinally on said supporting means and having an end extending exteriorly of said casing, a vertically disposed screen on said arm and extending across substantially the width of said panel, a frame on said supporting means extending horizontally across the inner side of said panel and provided with guideways, a tube mounting movable on said guideways to project the tube rays on any part of the horizontal extent of said screen, means for moving said mounting, auxiliary shutter blade means movable horizontally on said mounting to obstruct the outer rays from said tube and an abutment on each end of said frame positioned to engage and move said blade means on said mounting as said mounting approaches the opposite ends of said guideways, for restricting the tube rays to said screen.

14. A structure as specified in claim 13 in which said auxiliary shutter blade means comprises a pair of blades movable horizontally on said mounting on opposite sides of said tube, levers on said mounting having pivotal connections with said blades, spring means for moving said blades out of the path of the rays projected by said tube, and cams on the opposite ends of said frame positioned to engage and move said levers and said blades to partially obstruct said rays, as said mounting approaches the ends of said guideways, for restricting said rays to said screen.

HANSON BLATZ.

REFERENCES CITED

The following references are of record in the file of this patent:

UNITED STATES PATENTS

| Number | Name | Date |
| --- | --- | --- |
| 1,623,567 | Wappler et al. | Apr. 5, 1927 |
| 1,953,497 | Nelson | Apr. 3, 1934 |
| 2,082,965 | Lundquist | June 8, 1937 |
| 2,094,103 | Horsley et al. | Sept. 28, 1937 |
| 2,132,076 | Kotraschek et al. | Oct. 4, 1938 |
| 2,208,258 | Grobe | July 16, 1940 |
| 2,412,662 | Watson | Dec. 17, 1946 |
| 2,456,096 | Wehmer | Dec. 14, 1948 |
| 2,501,756 | Berggren | Mar. 28, 1950 |